United States Patent [19]

Wang et al.

[11] 4,419,160
[45] Dec. 6, 1983

[54] ULTRASONIC DYEING OF THERMOPLASTIC NON-WOVEN FABRIC

[75] Inventors: Kenneth Y. Wang; Bobby L. McConnell, both of Greensboro, N.C.

[73] Assignee: Burlington Industries, Inc., Greensboro, N.C.

[21] Appl. No.: 339,734

[22] Filed: Jan. 15, 1982

[51] Int. Cl.³ ............... B23K 27/08; B32B 31/20
[52] U.S. Cl. .................... 156/73.2; 156/277; 156/290; 156/296; 156/385; 156/553; 156/580.2; 156/582; 264/23; 428/296
[58] Field of Search .................. 156/73.1, 277, 290, 156/385, 553, 580.1, 580.2, 62.2, 582, 181, 296; 264/23; 425/174.2; 428/296, 198

[56] References Cited

U.S. PATENT DOCUMENTS

| | | | |
|---|---|---|---|
| 2,464,301 | 3/1949 | Francis, Jr. | 156/582 |
| 3,575,752 | 4/1971 | Carpenter | 156/181 |
| 3,733,234 | 5/1973 | Dunning | 156/62.2 |
| 3,765,974 | 10/1973 | Petersik et al. | 428/198 |
| 3,868,214 | 2/1975 | Shackleton | 8/471 |
| 3,966,519 | 6/1976 | Mitchell et al. | 156/73.1 |
| 3,989,448 | 11/1976 | Bohrn | 8/497 |
| 4,049,374 | 9/1977 | Rejto | 8/471 |
| 4,086,112 | 4/1978 | Porter | 156/73.1 |
| 4,147,507 | 3/1979 | Laus | 8/497 |
| 4,259,399 | 3/1981 | Hill | 428/288 |

Primary Examiner—Michael G. Wityshyn
Attorney, Agent, or Firm—Cushman, Darby & Cushman

[57] ABSTRACT

The ultrasonically bonded point bonds of non-woven fabric are dyed by applying liquid dye to the contacting crossing points of the fibers before or at the same time that they are bonded by the application of ultrasonic energy, such energy being used not only to effect the point bonds but also to drive and fix the dye in such point bonds.

11 Claims, 2 Drawing Figures

ULTRASONIC DYEING OF THERMOPLASTIC NON-WOVEN FABRIC

FIELD OF THE INVENTION

The invention relates to the dyeing of non-woven fabric and, more particularly, to the dyeing of non-woven fabric made of ultrasonically point-bonded fibers.

BACKGROUND OF THE INVENTION

The production of non-woven fabric from a batt or web of random, loose fibers by ultrasonic point bonding techniques is known as disclosed, for example, in U.S. Pat. No. 4,259,399, the disclosure of which is incorporated by reference herein. Such fabric, however, gives rise to problems in dyeing. The bonding points, where crossing contacting loose fibers have been fused together, have had the crystalline structure of the fiber altered by heat. The consequence of such alteration is that in general the bonding points do not dye to the same degree of uniformity by conventional dyeing processes and are highly visible in the finished fabric giving rise to an undesirable appearance.

BRIEF SUMMARY OF THE INVENTION

Accordingly, it is an object of this invention to provide a method and apparatus for dyeing the point bonds of non-woven fabric formed by ultrasonically bonding the contacting crossing points of fibers in a batt or web of random loose fibers.

It is another object of this invention to provide such apparatus and method wherein the dyeing and bonding are effected simultaneously by ultrasonic energy.

The invention is accomplished by distributing a fluent dye (such as a disperse or acid dye) directly on a web of random loose thermoplastic fibers, and advancing the web between the horn and anvil of an ultrasonic welding machine so that the ultrasonic energy simultaneously welds and bonds the contacting crossing points of the fibers, and drives and fixes the dye in such bond points. In a preferred embodiment, the anvil is a patterned roll and the dye is applied to the roll anvil by a kiss roll.

BRIEF DESCRIPTION OF THE DRAWINGS

Other objects and advantages of the invention will become apparent from the following description and accompanying drawings in which.

DETAILED DESCRIPTION OF THE INVENTION

Figure 1:
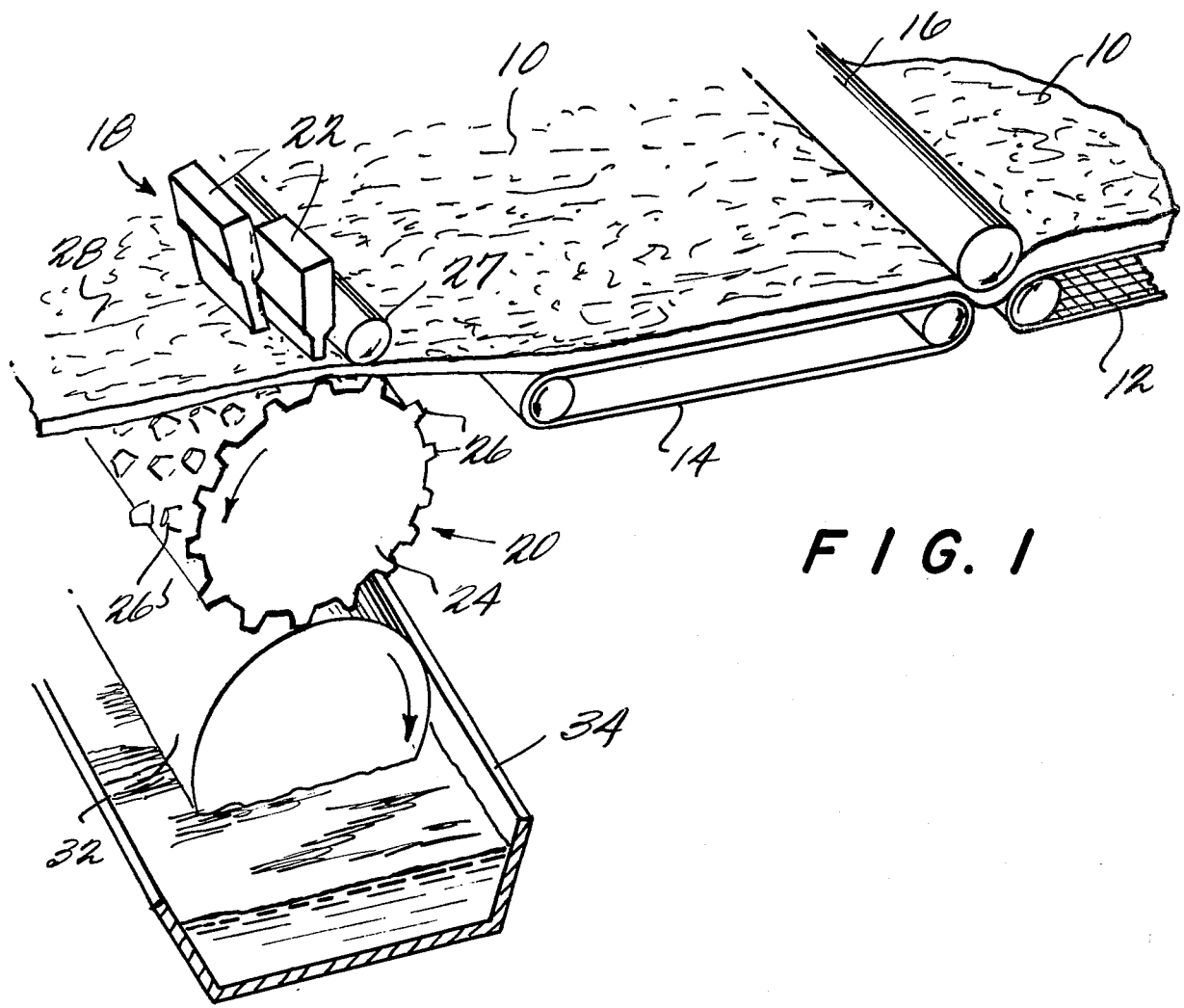
FIG. 1 is a diagrammatic perspective view illustrating a preferred form of the invention.

Referring now to FIG. 1 of the drawings, there is shown a batt or web 10 of random, loose fibers that are ultrasonically bondable, i.e. thermoplastic. A suitable fiber is polyester staple 2.25 dpf (denier per filament), 2" staple length, type 410 made by Celanese Corporation. This is a basic polyester staple made by many companies. Other types of ultrasonically bondable fibers suitable for producing non-woven fabrics are also usable, however, for practicing this invention.

The fibers are laid down in random orientation on an endless conveyor screen 12, preferably of wire, by known processes involving air and/or vacuum systems. The width of the resulting web or batt 10 may be in the range of from 45" to 125", the thicknesss in the range from ¼" to 1½", and the weight in the range of from 1.5 to 4.5 ounces per square yard.

At the discharge end of the conveyor screen 12 the web 10 may be transferred to an endless belt conveyor 14 with an overlying compression roller 16 at the transfer point to somewhat compact and compress the web. At the discharge end of the conveyor 14, the web 10 is advanced between the overlying horn means 18 and underlying anvil means 20 of an ultrasonic welding machin which may be, and preferably is, of the type disclosed in the aforementioned U.S. Pat. No. 4,259,399. In such a machine, the horn means 18 may comprise a transverse row of staggered or overlapping horns 22 each having about a 7", i.e., as measured transverse of the direction of movement of the web 10, and ½" in thickness, i.e. as measured in the direction of movement of the web. The anvil means 20 may comprise a roll 24 having a pattern of points 26 rotating at a peripheral speed substantially equal to the linear speed of the web 10 and in contact therewith. Immediately in advance of the machine, the web 10 may be further compacted and compressed by a roll 27 (which may be heated), such as described in copending U.S. application Ser. No. 290,714 filed Aug. 6, 1981, now U.S. Pat. No. 4,394,208.

As the web passes through the machine, the contacting crossing points of the fibers making up the web substantially melt and fuse togethr, by the application of ultrasonic energy thereto, to form a bond between crossed contacting fibers. The bonds form the web 10 into non-woven fabric 28 having a point bond pattern corresponding to the pattern of the anvil roll points 26.

In accordance with this invention a fluent (e.g., liquid, as opposed to on a transfer paper) dye is applied directly onto the web 10 before, or at the same time as, the web contacts the points 26 of the roll anvil 24, so that the dye covers the fibers at their contacting crossing points at the time of application thereto of ultrasonic energy by the machine. Such energy not only point bonds the fibers as aforedescribed but also the heat of such energy drives the dye into and fixes it in the point bonds.

Figure 2:
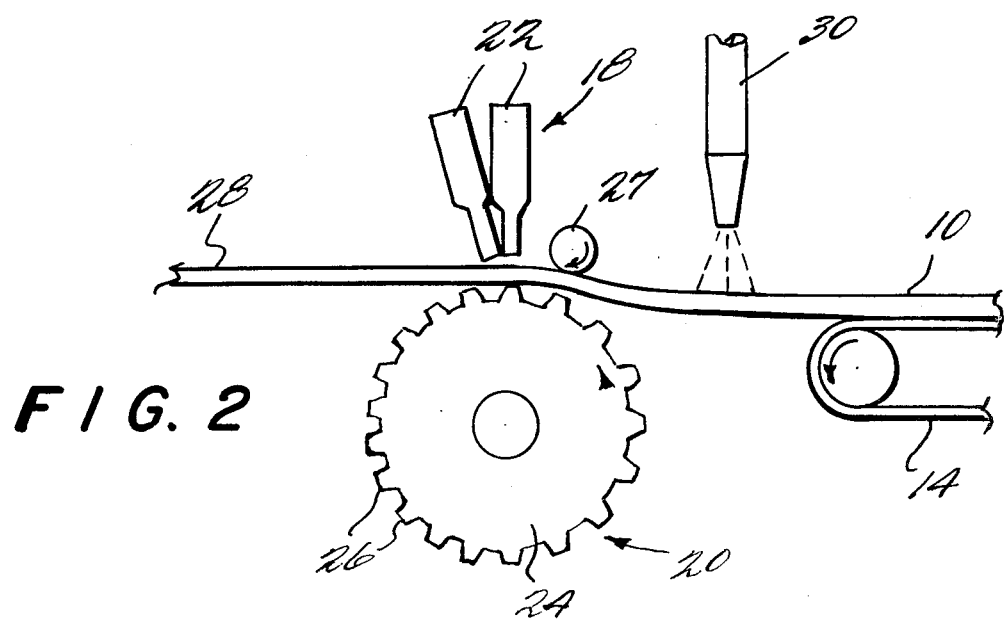
FIG. 2 is a fragmentary view corresponding to FIG. 1 of a modified form of the invention.

The dye may be applied to the entire surface of the web 10 in advance of the machine by appropriate padding, spray or kiss-roll devices, for example, by a row of spray nozzles 30 as shown in FIG. 2. For economy of dye usage, however, the dye may be applied to the anvil roll points 26 by a kiss-roll 32, as shown in FIG. 1. The lower portion of the kiss-roll 32 rotates in a bath of a paste or thick solution of the dye in an appropriate tray-like receptacle 34 beneath the anvil roll 24 with the latter in contact with the dye-covered upper surface of the kiss-roll. Thus, the dye is transferred from the kiss-roll 32 to the tops of the anvil points 26. The tops of the anvil points 26 then transfer the dye to the web 10 in a pattern corresponding to that of the anvil points.

When the dye is padded, sprayed or kiss coated onto the entire surface of the web 10, after the web has been point bonded and the bond sites simultaneously dyed by the ultrasonic welding machine, the non-woven fabric 28 may be appropriately heat treated to drive and fix the dye in the unbonded portion of the fibers to dye the entire fabric to a uniform shade or to a contrasting shade at the bond sites. Alternatively, the dye that is unfixed by the ultrasonic energy may be removed by subsequently washing the non-woven fabric leaving only the bond points dyed.

By deliberate selection of color, color contrasts, decorative effects and three-dimension effects can be obtained by dyeing the bond points. If these dyed points alone provide sufficient cover and decoration for some applications, a subsequent dyeing or dye-fixing heat treating step can be eliminated with attendant monetary saving.

Examples of practice of the invention follow:

Example 1

A solution containing 4.0% by weight of Disperse Blue 56 (63285) and 0.1% NID was prepared and sprayed on an unbonded web. The unbonded web was then passed under the ultrasonic horns for bonding.

Following scouring with a detergent, it was observed that the bond sites were dyed a blue color.

Example 2

A fabric prepared as in Example 1 was heated for 60 seconds at 390° F. (199° C.). The dye over the entire surface of the fabric was fixed, resulting in a uniform dyed background with darker dyed bond sites.

Example 3

A 4% solution of Disperse Blue 79 containing 0.1% NID and 3% of a thickener (Carbopol 801–5% solution) was applied to the anvil roll from a kiss roll. When an unbonded web was passed under the ultrasonic horns for bonding, the dye was fixed at the bond sites, producing an attractive fabric.

Example 4

A solution containing 6% Disperse Red 92, 0.1% anionic wetting agent (SS75) and 2% of a 3% alginate solution was kissed onto the anvil roll as in Example 3. When subjected to the ultrasonic treatment, there was produced a fabric dyed red at the bond sites.

Example 5

A solution of 3% Disperse Yellow 44 was prepared and applied as in Example 1. A fabric having yellow bond sites was produced.

Example 6

A solution containing 2% by weight of acid Blue 113 (26360) was applied as in Example 3 to the anvil roll. When an unbonded web was passed under the ultrasonic horns for bonding, the dye was fixed at the bond sites.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

What is claimed is:

1. A process of producing and dyeing non-woven fabric of ultrasonically fusible fibers with an ultrasonic welding machine having horn means and opposed anvil means, the steps comprising:
   forming a web of random, loose, ultrasonically fusible fibers;
   distributing a fluent dye directly onto the web; and
   advancing the web with the dye thereon between the horn means and anvil means of the ultrasonic welding machine to utilize the ultrasonic energy thereof to simultaneously bond the fibers in the web at their contacting crossing points to form non-woven fabric and drive the dye into the bond points and fix the dye therein.

2. The process defined in claim 1 in which the dye is a disperse dye.

3. The process defined in claims 1 or 2 in which the dye is distributed on the entire surface of the web in advance of the passage thereof through the machine.

4. The process defined in claim 3 including the step of removing unfixed dye from the non-woven fabric to leave dye fixed only in the bond points.

5. The process defined in claim 3 including the step of subjecting the non-woven fabric to a process for fixing therein dye thereon unfixed by the ultrasonic energy.

6. The process defined in claims 1 or 2 in which the anvil means is a roll in rolling contact with the web, wherein said distributing step is accomplished by coating the dye onto the roll anvil means in advance of its rolling contact with the web whereby the roll anvil means transfers dye to the web at the time of application of ultrasonic energy thereto.

7. The process defined in claim 6 in which the roll anvil means is patterned with anvil points and the dye is coated onto the tops of the points whereby the bond points are dyed in a pattern corresponding to that of the anvil points.

8. The process defined in claim 7 in which the dye is coated onto the roll anvil means by a kiss roll.

9. The process as defined in claim 1 wherein said distributing step is accomplished by spraying liquid dye onto the web just before the web is contacted by the horn and anvil means.

10. Apparatus for producing and dyeing non-woven fabric of ultrasonically fusible fibers comprising:
    an ultrasonic welding machine having horn means and opposed anvil means, said anvil means comprising a roll having a pattern of anvil points;
    means for advancing a web of random, loose ultrasonically fusible fibers between said horn means and said anvil means; and
    means for distributing a fluent dye directly onto the web so that at least those contacting crossing points of the fiber fused and bonded by the ultrasonic energy of the machine are coated with the dye at the time of the application of the ultrasonic energy thereto and the dye is driven into and fixed in said bond points, said distributing means comprising the tops of said anvil points and a kiss roll for applying the dye to said tops.

11. The apparatus defined in claim 10 further comprising a small diameter compression roll in operative association with the anvil means just in front of the horn means.

* * * * *